United States Patent
Miyazaki et al.

[11] Patent Number: 5,714,880
[45] Date of Patent: Feb. 3, 1998

[54] ROTATIONAL VELOCITY DETECTING ARRANGEMENT OF THE TONE WHEEL ON THE HUB UNIT FOR DETECTING ROTATIONAL VELOCITY OF AN AUTOMOBILE WHEEL SUPPORTED ON THE HUB UNIT

[75] Inventors: Hiroya Miyazaki, Fujisawa; Junshi Sakamoto, Yokohama, both of Japan

[73] Assignee: NSK Ltd., Tokyo, Japan

[21] Appl. No.: 301,317

[22] Filed: Sep. 6, 1994

[30] Foreign Application Priority Data

Sep. 6, 1993 [JP] Japan .................. 5-048365

[51] Int. Cl.$^6$ .................................................. G01P 3/44
[52] U.S. Cl. .................................. 324/173; 384/448
[58] Field of Search ............................. 324/173, 174, 324/207.15–207.17, 260–262, 207.25, 166; 384/448, 535, 544, 624; 310/90, 155, 168

[56] References Cited

U.S. PATENT DOCUMENTS

| | | | |
|---|---|---|---|
| 4,795,278 | 1/1989 | Hayashi | 324/174 X |
| 4,797,612 | 1/1989 | Nakamishi et al. | 324/174 X |
| 4,907,445 | 3/1990 | Okumura | 324/173 |
| 4,916,390 | 4/1990 | Christoleit et al. | 324/174 |
| 4,969,694 | 11/1990 | Caron | 310/168 |
| 4,978,234 | 12/1990 | Ouchi | 324/173 |
| 5,131,763 | 7/1992 | Caron | 324/207.25 |
| 5,148,104 | 9/1992 | Ishikawa | 324/173 |

FOREIGN PATENT DOCUMENTS

| | | |
|---|---|---|
| 0 317 423 | 5/1989 | European Pat. Off. . |
| 0401464 | 12/1990 | European Pat. Off. . |
| 0 454 547 | 10/1991 | European Pat. Off. . |
| 88 16 381 | 7/1989 | Germany . |

Primary Examiner—Sandra L. O'Shea
Assistant Examiner—Jay M. Patidar
Attorney, Agent, or Firm—Helfgott & Karas, PC

[57] ABSTRACT

A hub unit has a hub with a nut tightened at an axially inner end which is partly projected from the nut. A tone wheel is secured to the axially inner end of the hub. The tone wheel has an outer cylindrical portion provided around the nut and having magnetic properties changing alternatively in a circumferential direction with a uniform interval. An outer ring is provided, which has an axially inner open end. A cover covers the axially inner open end of the outer ring. The hub unit also has a sensor of a passive type supported by the cover and having a detecting portion facing to the outer periphery of the outer cylindrical portion of the tone wheel.

2 Claims, 5 Drawing Sheets

5,714,880

ROTATIONAL VELOCITY DETECTING ARRANGEMENT OF THE TONE WHEEL ON THE HUB UNIT FOR DETECTING ROTATIONAL VELOCITY OF AN AUTOMOBILE WHEEL SUPPORTED ON THE HUB UNIT

FIELD OF THE INVENTION

This invention is related to a hub unit for detecting a rotational velocity, specifically to a hub unit which is used to rotatably support an automobile wheel with respect to a suspension apparatus and to detect a rotational velocity of the wheel.

BACKGROUND OF THE INVENTION

A hub unit is used to detect the rotational velocity of the automobile wheel in order to rotatably support the automobile wheel with respect to the suspension apparatus while controlling the anti lock brake system (ABS) and/or traction control system (TCS). Such a hub unit for detecting a rotational velocity is disclosed e.g. in U.S. Pat. No. 4,907,445.

FIG. 1 shows a hub unit for detecting the rotational velocity which, as shown in U.S. Pat. No. 4,907,445, comprises a flange section 1 disposed at an axially outer end portion (leftmost end in FIG. 1) to support an automobile wheel, a hub 3 formed with a first inner raceway 2a on its outer peripheral surface at its midway portion and with a male-thread portion 5 on its outer peripheral surface at its axially inner end portion (rightmost end of FIG. 1), an inner ring member 4 formed with a second inner raceway 2b on its outer peripheral surface and fitted onto the outer peripheral surface of the hub at its midway portion, a nut 6 threaded onto the male-thread portion 5 so as to press against the inner end face of the inner ring member 4 as it is threaded, thereby fixing the inner ring member 4 at a predetermined position on the outer peripheral surface of the hub 3, an outer ring member 9 formed with a double row of outer raceways 8a, 8b on its inner peripheral surface and with a mount portion 7 on its outer peripheral surface to be connected to a suspension apparatus (not shown) for supporting, and a plurality of rolling elements 10 provided between the hub 3 and the outer ring member 9. The hub 3 for supporting the wheel is rotatably supported inside the outer ring member 9 which is supported by the suspension apparatus.

There is a cylindrical tone wheel or pulser ring 11 which is fitted onto the inner ring member 4 at its axially inner portion. The tone wheel or pulser ring 11 is formed with a land-recess portion 12 on its axially inner end face. Specifically, a plurality of circumferential recess areas are interposed between a plurality of circumferential lands so as to change the magnetic properties of the axially inner end portion in a circumferential direction alternatively at a uniform interval.

A cover member 13 is fitted into the opening at the axially inner end of the outer ring member 9 to cover the opening. A sensor 14 is securely mounted to the cover 13 and has an axially outer face opposed to the land-recess portion 12 of the tone wheel or pulser ring 11.

In operation, the automobile wheel is secured to the flange section 1 on the axially outer portion of the hub 3 and supported rotatably with reference to the suspension apparatus by which the outer ring member 9 is supported. As the tone wheel or pulser ring 11 fitted onto the inner ring member 4 is rotated due to the rotating wheel, the sensor 14 opposed to the land-recess portion 12 formed on axially inner end face of the tone wheel or pulser ring 11 changes its output. The frequency at which the output of the sensor 14 is changed is proportional to the rotating velocity of the automobile wheel.

Accordingly, by inputting the output signal of the sensor 14 into the control device (not shown), the rotational velocity of the automobile wheel is obtained so as to control the ABS and/or the TCS in a suitable manner.

The prior art hub unit for detecting a rotational velocity as mentioned above is difficult to be made compact, and its use is limited to a relatively large sized automobile. Specifically, the sensor 14 is axially faced to the land-recess portion 12 formed on the axial end face of the tone wheel or pulser ring so as to detect the rotational velocity of the wheel. Consequently, the axial size of the mechanism for detecting the rotational velocity is made larger.

In order to reduce the production cost, the tone wheel or pulser ring 11 is made of a magnetic material, not of a permanent magnet material, and the sensor 14 facing to the tone wheel or sensor 11 is comprised of a magnetic core member with a coil wound around it. This is referred to as a passive type. The sensor 14 of the passive type is inclined to be larger in axial size so as to produce sufficient outputs. Accordingly, the hub unit for detecting the rotational velocity is inclined to have a greater size in an axial direction.

Another prior art hub units for detecting a rotational velocity are disclosed in Japanese Patent First Publication KOKAI No. H1-175502 and Japanese Utility Model First Publication KOKAI No. H3-99676. In these hub units, the tone wheel or pulser ring has an inner or outer peripheral surface with its magnetic property changed in a circumferential direction, while the sensor has a detecting portion opposed to the inner or outer peripheral surface. These hub units, however, are not easy to be made compact because the core member of the passive type sensor is axially mounted in it.

Further, Japanese Utility Model First Publication KOKAI No. H4-36121 discloses a tone wheel or pulser ring rotating with the outer ring member, the inner peripheral surface of which is faced to a sensor. This prior art structure, however, is limited in and totally different from the one to which the present invention is applied.

SUMMARY OF THE INVENTION

An objective of the present invention is to provide a hub unit for detecting a rotational velocity overcoming the problems as mentioned above.

The present invention provides a hub unit for detecting a rotational velocity comprising a hub having a flange section provided at an axially outer end portion so as to mount an automobile wheel to it, and provided at an midway portion with an outer peripheral surface with an inner ring so that a first inner raceway is formed on it, an inner ring member fitted onto the outer peripheral surface of the hub at the midway portion to have an outer peripheral surface so that a second inner raceway is formed on it, the hub having a male thread portion on its outer peripheral surface at an axially inner end portion, a nut threaded onto the male thread portion so as to press against the axially inner face of the inner ring member as it is tightened on the male thread portion, so that the inner ring member is secured at a predetermined position on the outer peripheral surface of the hub, an outer ring member having an outer peripheral surface to which a mount section is provided to support a suspension device end an inner peripheral surface on which a plurality of outer raceways in rows are formed, a plurality of rolling elements provided between the hub and the outer ring member, a tone wheel or pulser ring mounted to the hub, and a sensor supported by the outer ring member so as to face to the tone wheel or pulser ring, and (a) the tone wheel made of a plastically worked or processed magnetic metal plate, and comprising a cylindrical section having a larger inner diameter than the maximum circumdiameter of the nut, and an annular ring section extending from the axial end edge of the cylindrical section, so that the outer peripheral surface of the cylindrical section has a magnetic property changing alternatively at a uniform interval, in a circumferential direction, (b) the tone wheel or pulser ring secured to the hub with the cylindrical section provided around the nut and with the annular ring section supported by a portion of the axially inner end portion of the hub, (c) the outer ring member having an axially inner opening which is covered by a cover having an opening at its axially outer end portion, such that the axially outer end portion of the cover is fitted onto or into the axially inner end portion of the outer ring member, and (d) the sensor being securely supported by the cover, and the detecting portion of the sensor faced radially to the outer peripheral portion of the cylindrical section of the tone wheel or pulser ring.

DESCRIPTION OF THE PREFERRED EMBODIMENTS

Figure 1:
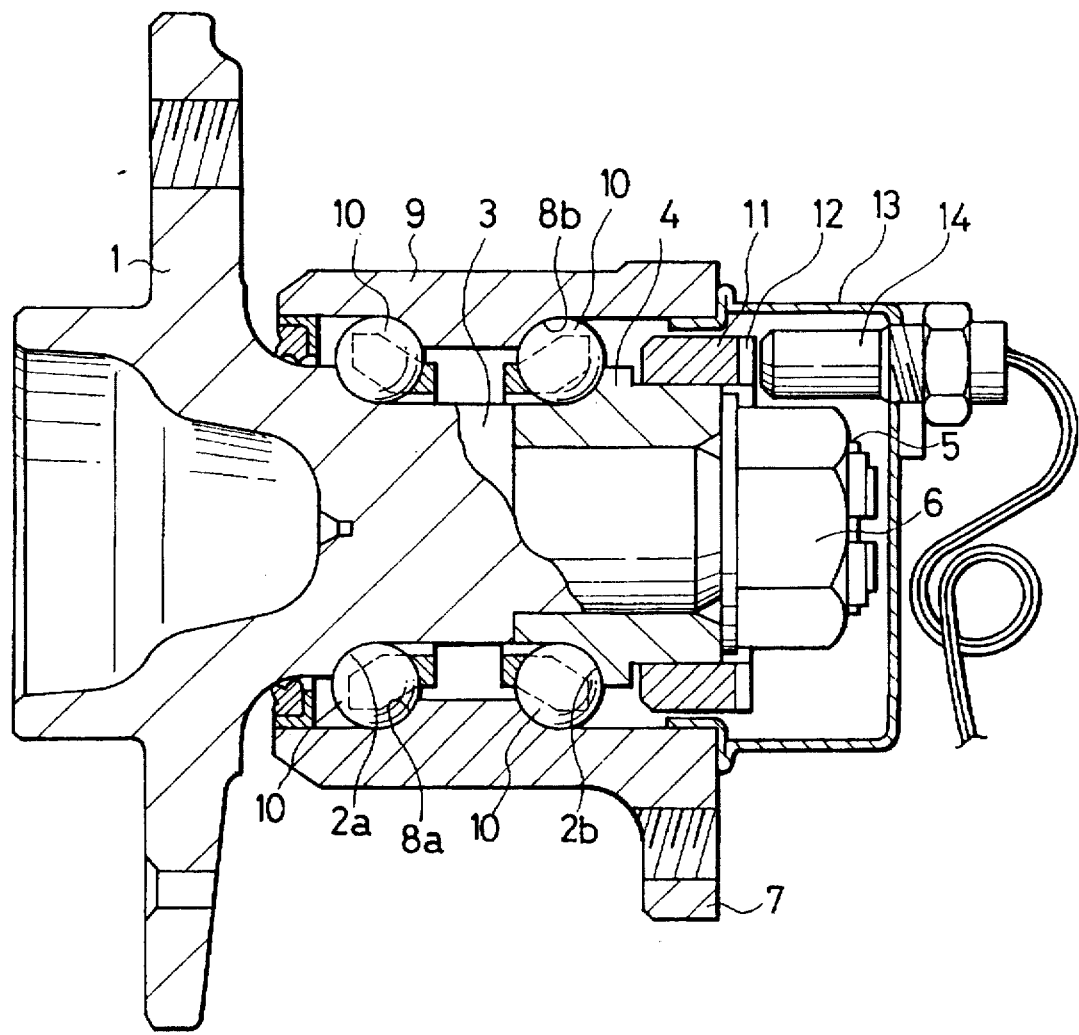
FIG. 1 is cross-sectional view of a hub unit of the prior art.
Figure 2:
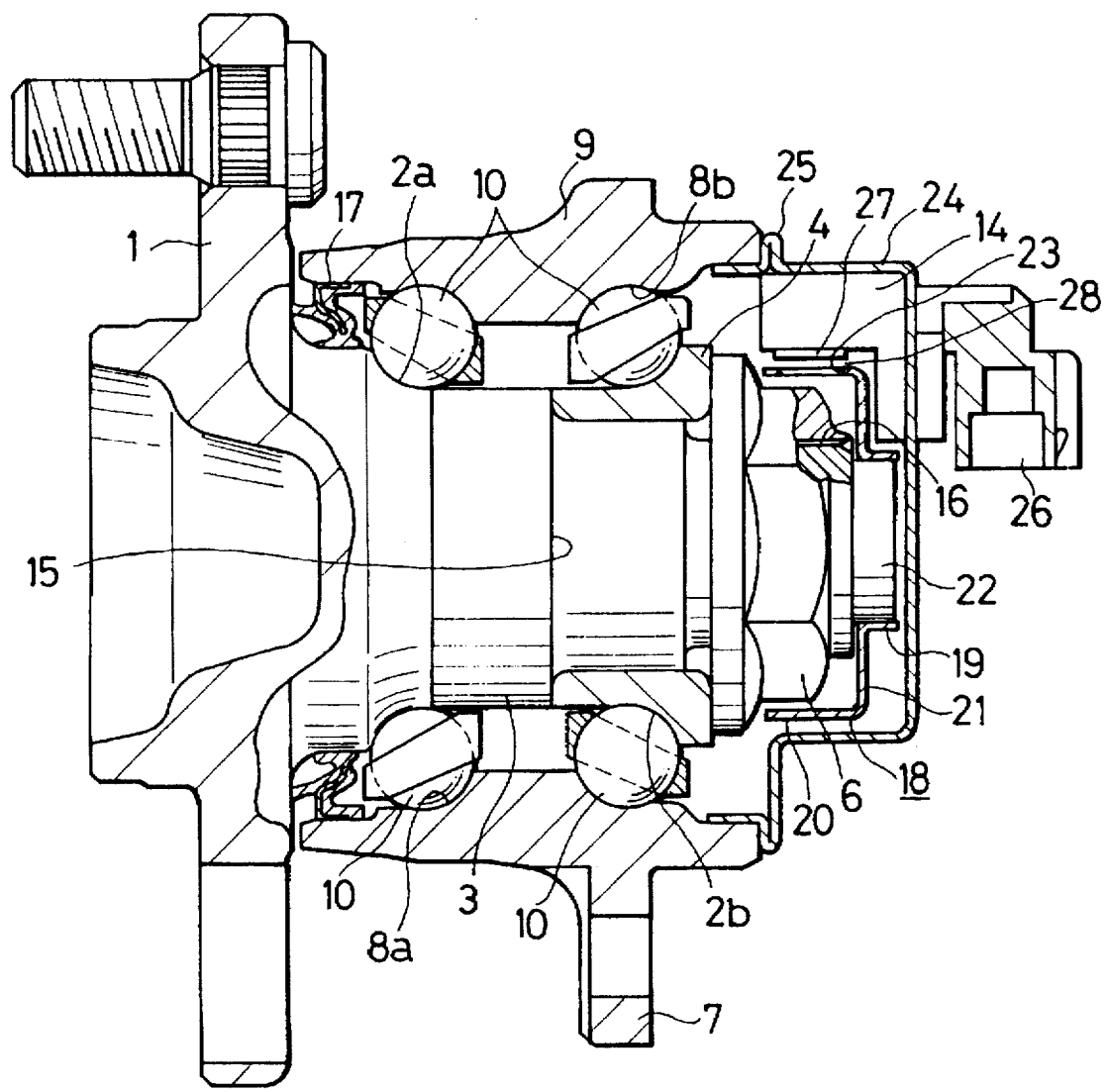
FIG. 2 is a cross-sectional view of the hub unit of a first embodiment of the present invention.
Figure 3:
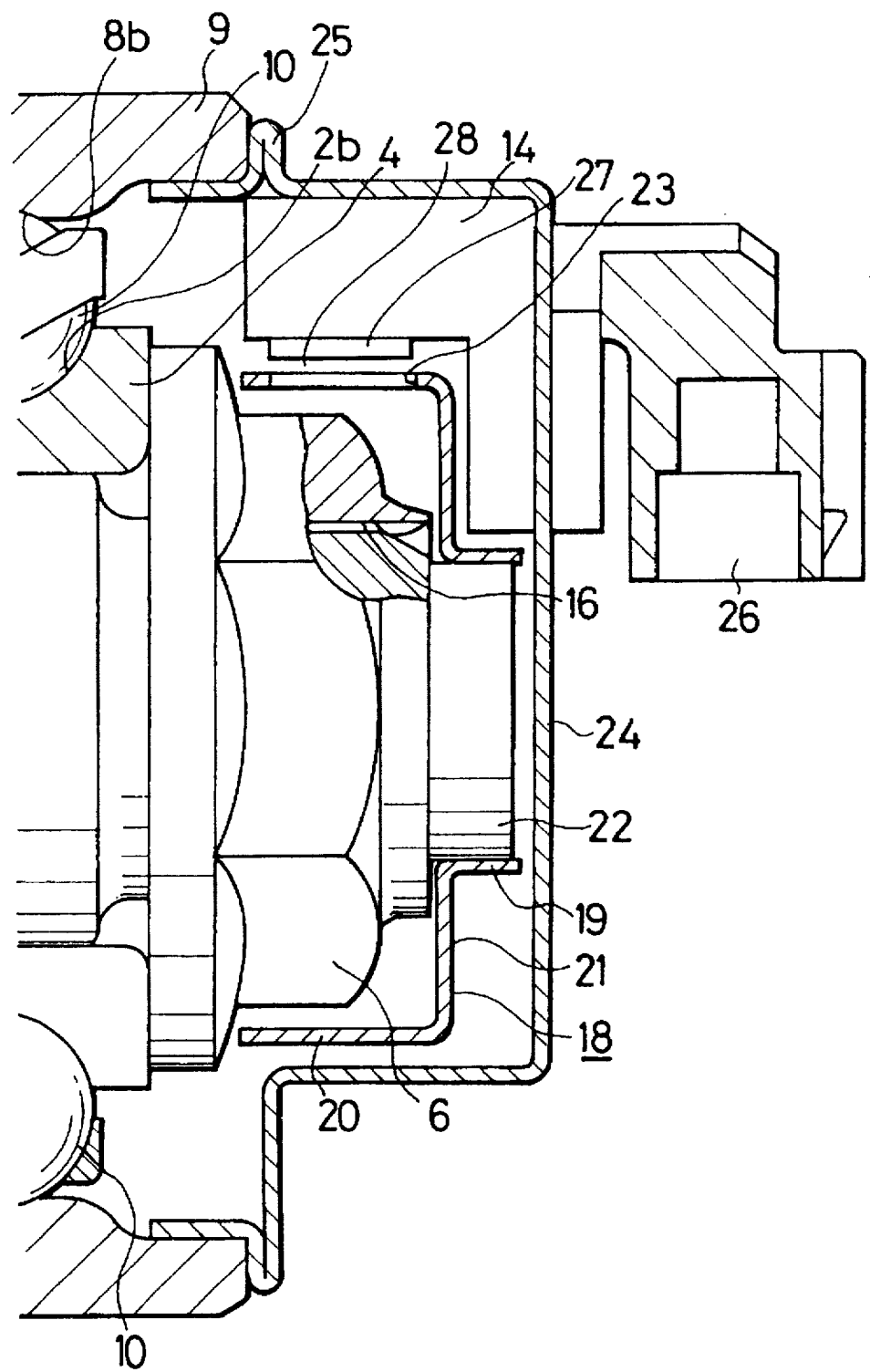
FIG. 3 is an enlarged view of the right side part of the hub unit of FIG. 2.

FIG. 2 and FIG. 3 show an embodiment of the hub unit for detecting a rotational velocity according to the present invention.

The hub 3 has an axially outer end portion (the leftmost portion in FIG. 2) the outer peripheral surface of which is formed with a flange section 1 to have an automobile wheel mounted to it.

The hub 3 has an axially midway portion the outer peripheral surface of which is formed with a first inner raceway 2a and a step portion 15.

An inner ring member 4 is fitted onto the outer peripheral surface of the hub 3 with its axially outer end face (the left end face in FIG. 2) abutted to the step portion 15, and formed with a second inner raceway 2b on the outer peripheral surface of the inner ring member 4.

Although the first inner raceway 2a is formed directly on the outer peripheral surface of the hub 3, the first inner raceway 2a can be formed on another inner ring member (not shown) separated from the hub 3, so that this another inner ring member is fitted onto the hub 3 together with the inner ring member 4.

The hub 3 has a male thread portion 16 at its axially inner end portion so that a nut 6 is threaded on it. As the nut 6 is tightened, the inner ring 4 is secured to a predetermined portion on the outer peripheral surface of the hub 3.

Provided around the hub 3 is an outer ring member 9 which has a mount portion 7 on its outer peripheral surface at its midway portion, so that the outer ring member 9 is securely mounted to a suspension apparatus (not shown).

Disposed on the inner peripheral surface of the outer ring member 9 are outer raceways 8a, 8b opposed to the first and second inner raceways 2a, 2b, respectively.

There are a plurality of rolling elements 10 between the first and second inner raceways 2a, 2b and the outer raceways 8a, 8b, respectively, so that the hub is rotatable within the outer ring member 9.

Disposed between the inner peripheral surface of the outer ring member 9 at its axially outer end portion and the outer peripheral surface of the hub 3 is a seal ring 17 which covers the axially outer open portion of the interior space between the inner peripheral surface of the outer ring member 9 and the outer peripheral surface of the hub 3 to accommodate the rolling elements 10.

The axially inner end portion of the hub 3 projects axially inwards out of the male thread portion 16 with its tip end placed axially inward of the male thread portion 16.

The end portion of the hub 3 has en outer peripheral surface on which a cylindrical surface portion 22 with a uniform diameter is formed so as to support the tone wheel or pulser ring 18.

The diameter of the cylindrical surface portion 22 is apparently smaller than that of the bottom of thread in the male thread portion 16.

The tone wheel or pulser ring 18 is made of a magnetic metal plate such am steel plate through the plastic working such as pressing, drawing.

The tone wheel or pulser ring 18 is comprised of an inner cylindrical portion 19 with a smaller diameter, an outer cylindrical portion 20 with a larger diameter and concentric with the inner cylindrical portion 19, and an annular ring portion 21 for connecting the both cylindrical portions 19 and 20 to each other. The inner cylindrical portion 19 in a free state has an inner diameter slightly smaller than the outer diameter of the cylindrical portion 22, while the outer cylindrical portion 20 has an inner diameter larger than the maximum circumdiameter of the nut 6.

Specifically, the axially outer edge (left end edge in FIGS. 2 and 3) of the inner cylindrical portion 19 is connected to the axially inner edge (right end edge in FIGS. 2 and 3) of the outer cylindrical portion 20 through the annular ring portion 21, so that the tone wheel or pulser ring 18 is formed generally in an annular shape end in a crank shape in cross section.

The outer cylindrical portion 20 is formed with a plurality of through-holes 23 arranged in a circumferential direction with a uniform space between them.

Consequently, the circumferential magnetic properties of the outer peripheral surface of the outer cylindrical portion 20 are alternatively changed at a uniform interval.

The inner cylindrical portion 19 of the tone wheel or pulser ring 18 is fitted onto the cylindrical surface portion 22 formed at the axially inner end portion of the hub 3 so that the tone wheel or pulser ring 18 is securely mounted to the hub 3.

The outer cylindrical portion 20 is placed around the nut 6 in the state where the tone wheel 18 is secured to the hub 3.

The cover 24 is used to cover the axially inner open end portion of the outer ring member 9 so as to prevent the foreign materials such as dust, rain water from entering into the outer ring member 9 through the open end portion.

The cover 24 is made of a metal plate such as stainless steel plate by way of a drawing process etc.

The cover 24 has an opening at its axially outer end and a stop projection 25 near the opening along its outer periphery.

The cover 24 has an outer diameter at the portion of the opening which is substantially the same to or slightly larger than the inner diameter of the axially inner open end portion of the outer ring member 9. Consequently, the portion of the cover 24 near the opening can be moved into the axially inner open end portion of the outer ring member 9 in a fitting relationship until the annular stop projection 25 comes into contact with the axially inner end face of the outer ring member 9.

The sensor 14 of a passive type is supported in the cover 24 and controlled in position. The output signals from the sensor 14 are sent out through a lead (not shown) connected to a connector 26 on the outer surface of the cover 24.

The sensor 14 has a detecting portion 27 raced radially inward of the cover 24.

The detecting portion 27 is opposed to the outer peripheral surface of the outer cylindrical portion 20 with a clearance 28 of about 0.5 mm to about 1.0 mm when the cover 24 is securely fitted into the axially inner end portion of the outer ring member 9.

The sensor 14 has a core member extending in the circumferential direction (front-rear directions of the sheet in FIGS. 2 and 3) of the tone wheel or pulser ring 18.

The core member has at least one end bent radially inwards to form the detecting portion 27 and mated with the adjacent outer peripheral surface of the tone wheel or pulser ring 18.

The detecting portion 27 can be made from a pole piece different from the core member.

The hub unit for detecting the rotational velocity as mentioned above is used to rotatably support an automobile wheel with reference to the suspension apparatus and to detect the rotational velocity of the wheel securely mounted to the flange section 1 of the hub 3. These function and operation is substantially the same as those in the prior art hub unit previously explained.

Although the sensor 14 of the passive type has a rather longer size, the hub unit for detecting the rotational velocity in this embodiment allows the sensor 14 to be located radially outside the tone wheel or pulser ring 18 and to extend longer in a circumferential direction, so that the axial and radial sizes of the hub unit is compact so as to be accommodated in a limited space in the compact car.

It will be noted that the bottom at the axially inner end of the cover 24 has partly recessed to support there the sensor 14 of a sector shape in cross section when looked in an axial direction.

Accordingly, the sensor 14 is hard to be moved by vibrations in radial directions.

The sensor 14 has a synthetic resin component which has a larger radial dimension at the portion closer to its axial inner end with reference to the annular ring portion 21 in order to securely keep the rigidity and strength of the sensor portion including the connector 26.

Figure 4:
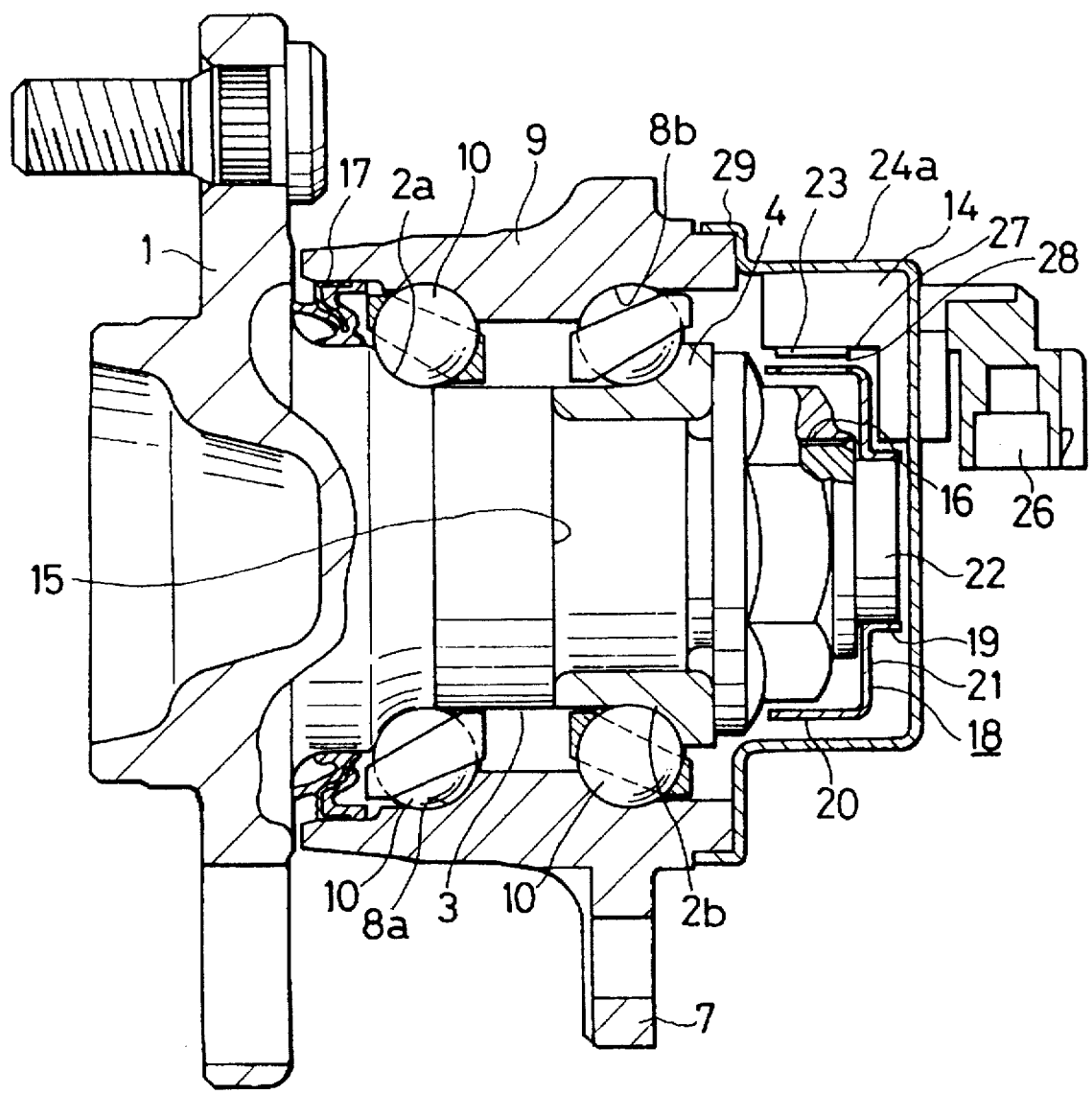
FIG. 4 is a cross-sectional view of the hub unit of a second embodiment of the present invention.

FIG. 4 shows a second embodiment of the present invention. The outer ring member 9 has an axially inner open end portion which is covered by the cover 24a which has a cylindrical fitting portion 29 with its axially outer end portion formed in a crank shape in cross section.

Thus, the axially outer end portion or cylindrical fitting portion 29 is fitted onto the axially inner end portion of the outer ring member 9, so that the cover 24a is securely mounted to the outer ring member 9.

The other constructions and functions are substantially the same as those of the first embodiment.

Figure 5:
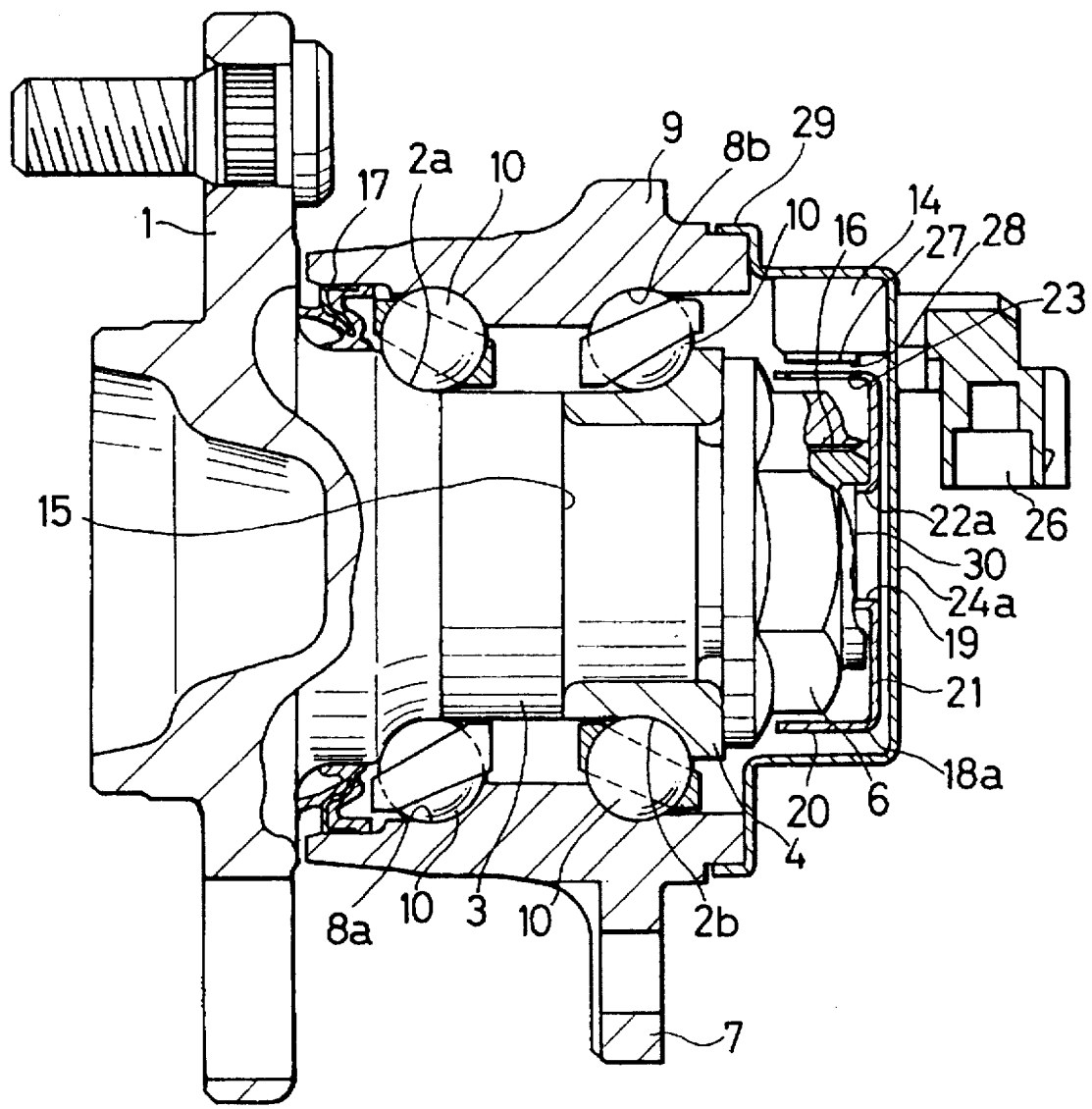
FIG. 5 is a cross-sectional view of the hub unit of a third embodiment of the present invention.

FIG. 5 shows a third embodiment. The hub 3 has an axially inner end face formed with a circular recess 30 which has an inner peripheral surface 22a in a cylindrical shape with axially uniform diameter. The tone wheel or pulser ring 18a comprises an inner cylindrical portion 19, an outer cylindrical portion 20 and an annular ring portion 21 such that the inner and outer cylindrical portions 19 and 20 are bent and extended from and in the same direction with reference to the annular ring portion 21.

The inner cylindrical portion 19 is fitted into the cylindrical inner peripheral surface 22a, so that the tone wheel or pulser ring 18a is securely mounted to the axially inner end portion of the hub 3.

The other structures and functions are substantially the same as those of the second embodiment.

According to the hub unit for detecting rotational velocity of the present invention, the automobile wheel is rotatably supported by the suspension apparatus, while the rotational velocity of the automobile wheel fixed the hub is detected in a substantially same manner as in the prior art hub unit.

In the hub unit for detecting the rotational velocity according to the present invention, since the sensor is disposed radially outside the tone wheel or pulser ring, the whole axial length is shortened, so that the hub unit is used in a limited space in the compact car etc. In addition, the core member of the sensor is arranged in a circumferential direction of the tone wheel or pulser ring, the length of the core member is sufficiently long, so that the output of the sensor is sufficiently produced, while the sensor is not projected radially outwards.

The installation of the hub unit according to the present invention into the automobile is easy, so that the present invention will allow easy design for the automobile.

What is claimed is:

1. A hub unit for detecting a rotational velocity, comprising a hub having a flange section provided at an axially outer end portion so as to mount an automobile wheel thereto and provided at a middle portion thereof with an outer peripheral surface having a first inner raceway, an inner ring member having an outer peripheral surface forming a second inner raceway, said inner ring member being fitted onto said outer peripheral surface of the hub and having an axially inner face, the hub having a male thread portion on the outer peripheral surface thereof at an axially inner end portion, a nut threaded onto the male thread portion to press against the axially inner face of the inner ring member to secure the inner ring member at a predetermined position on the outer peripheral surface of the hub, an outer ring member having an outer peripheral surface to which a mount section is provided connected to a suspension apparatus and an inner peripheral surface on which a plurality of outer raceways in rows are formed corresponding to the first and second inner raceways, a plurality of rolling elements provided between the first and second inner raceways and the outer raceways, a tone wheel mounted to the hub, and a sensor supported by the outer ring member so as to face to a tone wheel, the tone wheel being made of a plastically processed magnetic metal plate and comprising a cylindrical section having a larger inner diameter than the maximum circumdiameter of the nut and having an outer peripheral surface and an axial end edge, and an annular ring section extending from the axial end edge of the cylindrical section, and the outer peripheral surface of the cylindrical section having magnetic properties changing alternatively at a uniform interval in a circumferential direction, the tone wheel being secured to the hub with its cylindrical section provided around the nut and with the annular ring section supported by a portion of the axially inner end portion of the hub, the outer ring member having an axially inner end portion with an opening which is covered by a cover having an axially outer end portion with an opening, and the axially outer end portion of the cover being mounted to the axially inner end portion of the outer ring member in a fitting relationship, and the sensor being securely supported by the cover and having a detecting portion facing radially to the outer peripheral surface of the cylindrical section of the tone wheel so that a rotational velocity is detected on the outer peripheral surface of the tone wheel.

2. The hub unit of claim 1, wherein the sensor is of a passive type having a magnetic core member, a coil wound around the magnetic core member and the detecting portion, the magnetic core member extending in a circumferential direction of the tone wheel.

* * * * *